Figure 2:
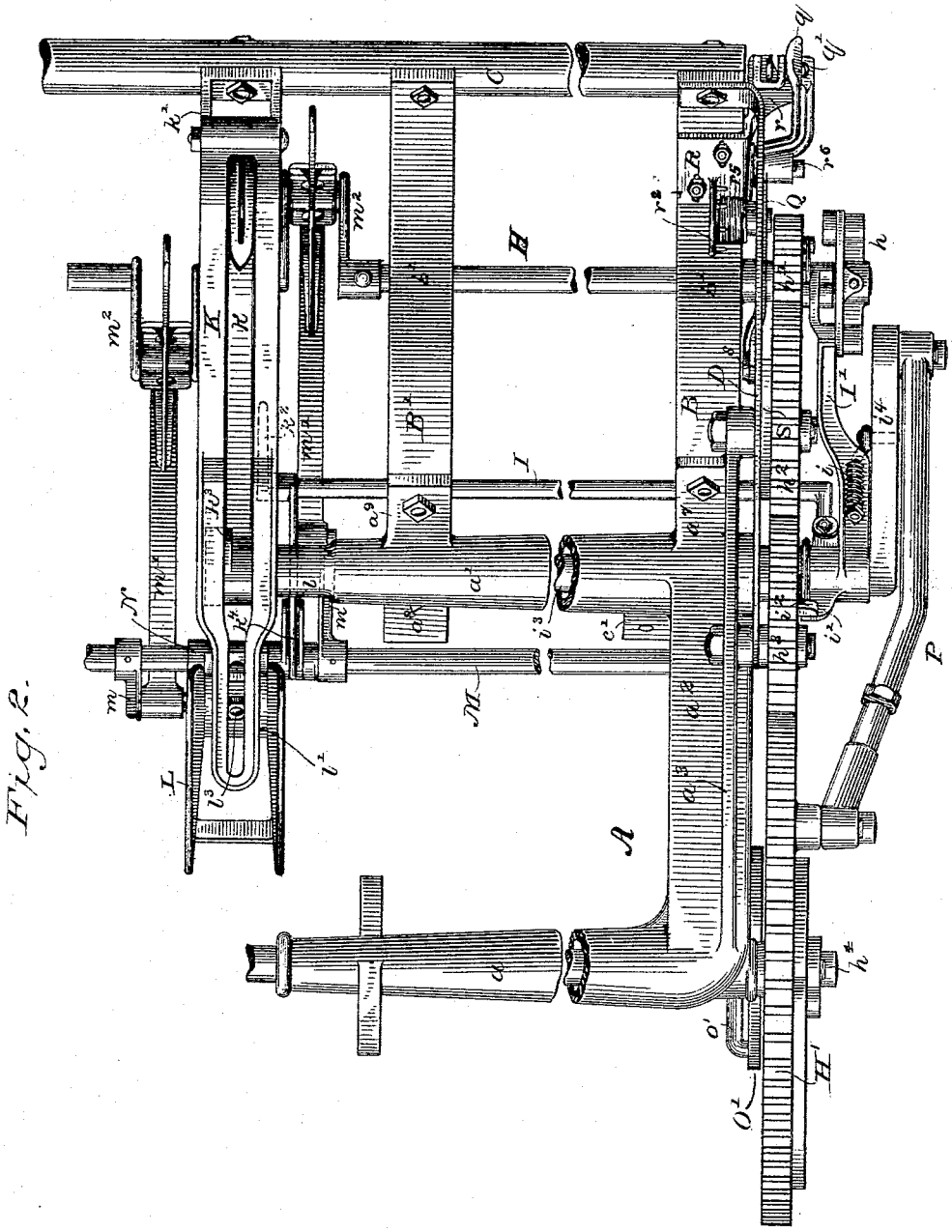

(No Model.) 7 Sheets—Sheet 1.

W. R. BAKER & H. E. PRIDMORE.
GRAIN BINDER.

No. 339,518. Patented Apr. 6, 1886.

Fig. 1.

WITNESSES
Wm A. Skinkle
Geo. W. Young

INVENTOR
William R. Baker.
Henry E. Pridmore
By their Attorneys (No Model.) 7 Sheets—Sheet 2.

W. R. BAKER & H. E. PRIDMORE.
GRAIN BINDER.

No. 339,518. Patented Apr. 6, 1886.

WITNESSES
Wm A. Skinkle
Geo. W. Young

INVENTOR
William R. Baker
Henry E. Pridmore.
By their Attorneys (No Model.) 7 Sheets—Sheet 3.

W. R. BAKER & H. E. PRIDMORE.
GRAIN BINDER.

No. 339,518. Patented Apr. 6, 1886.

WITNESSES

INVENTOR
William R. Baker,
Henry E. Pridmore.
By their Attorneys (No Model.) 7 Sheets—Sheet 4.

W. R. BAKER & H. E. PRIDMORE.
GRAIN BINDER.

No. 339,518. Patented Apr. 6, 1886.

WITNESSES
Wm A. Skinkle
Geo. W. Young

INVENTOR
William R. Baker.
Henry E. Pridmore.
By their Attorneys (No Model.) 7 Sheets—Sheet 5.
W. R. BAKER & H. E. PRIDMORE.
GRAIN BINDER.
No. 339,518. Patented Apr. 6, 1886.
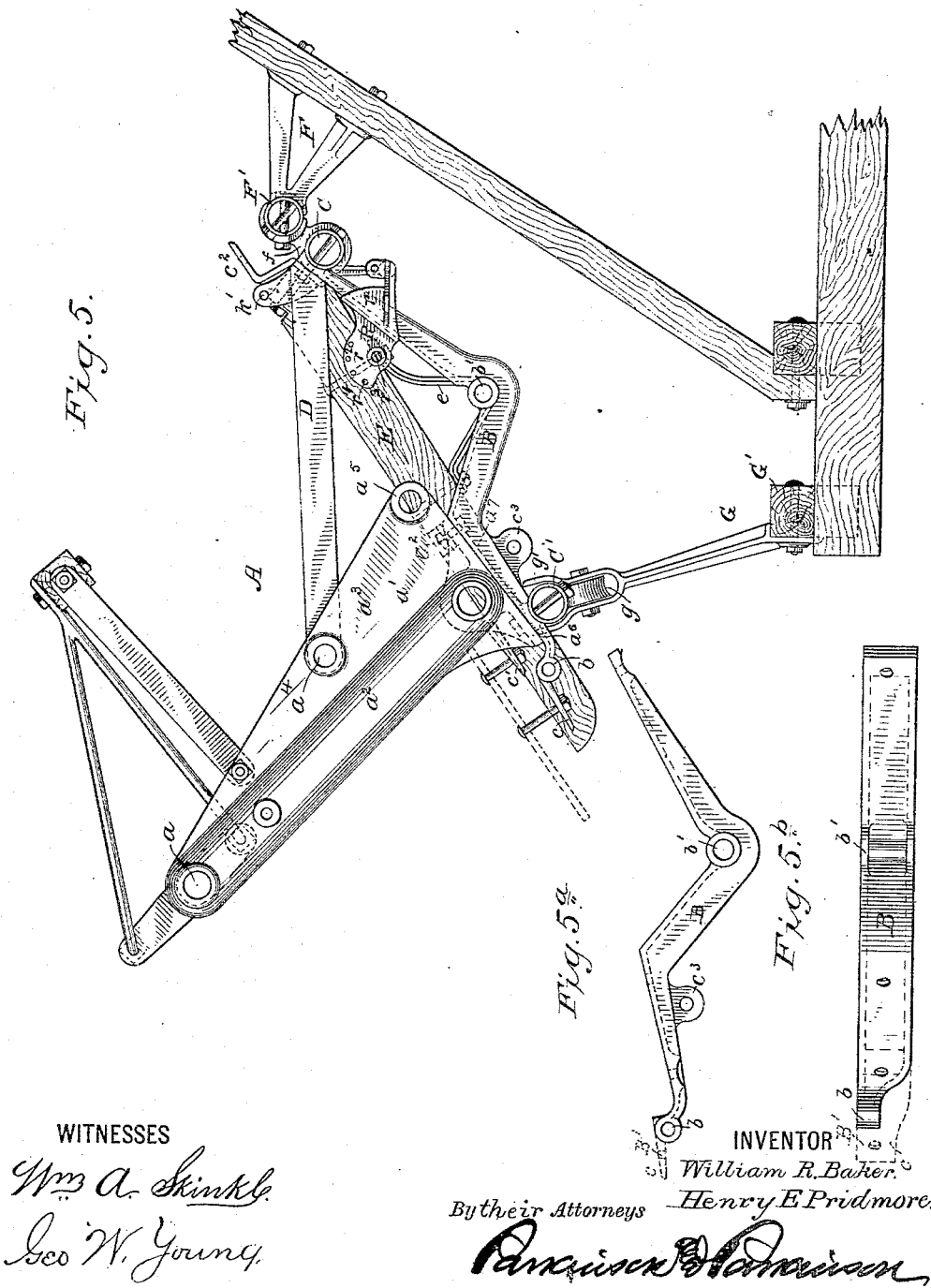
WITNESSES
Wm A. Skinkle
Geo. W. Young
INVENTOR
William R. Baker
Henry E Pridmore
By their Attorneys (No Model.) 7 Sheets—Sheet 6.
W. R. BAKER & H. E. PRIDMORE.
GRAIN BINDER.
No. 339,518. Patented Apr. 6, 1886.
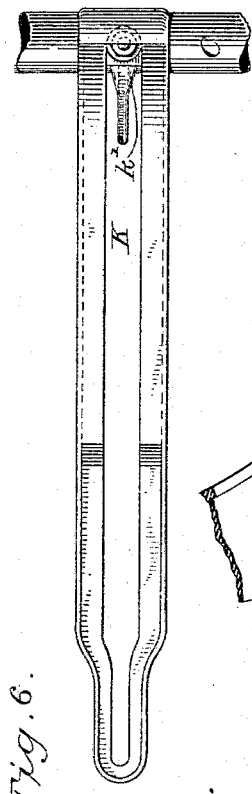
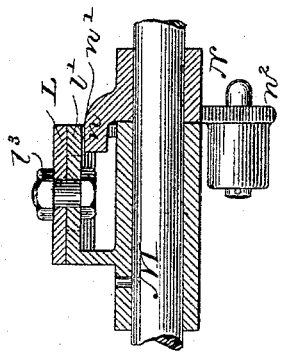
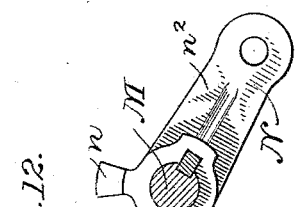
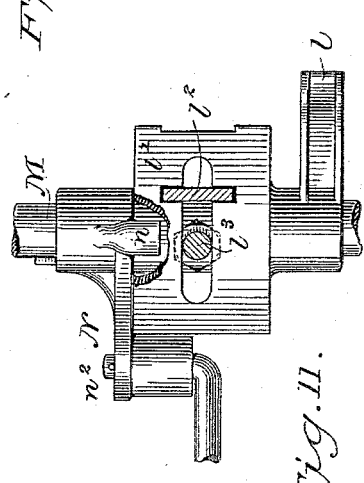
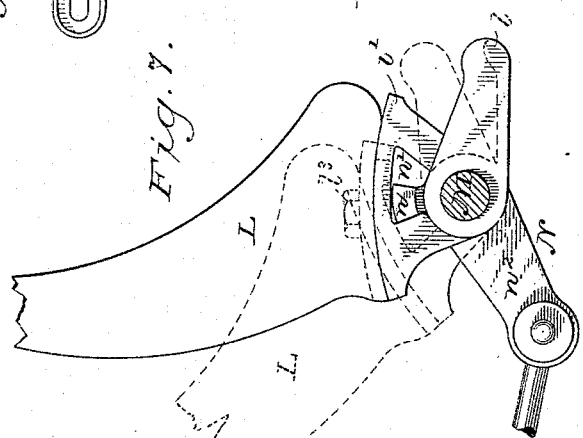
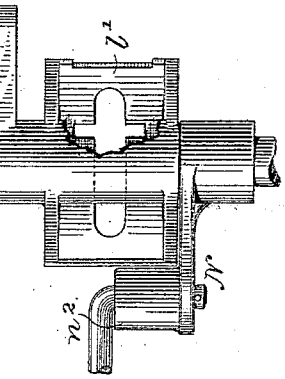
WITNESSES
Wm A. Skinkle
Geo. W. Young
INVENTOR
William R. Baker.
Henry E. Pridmore.
By their Attorneys

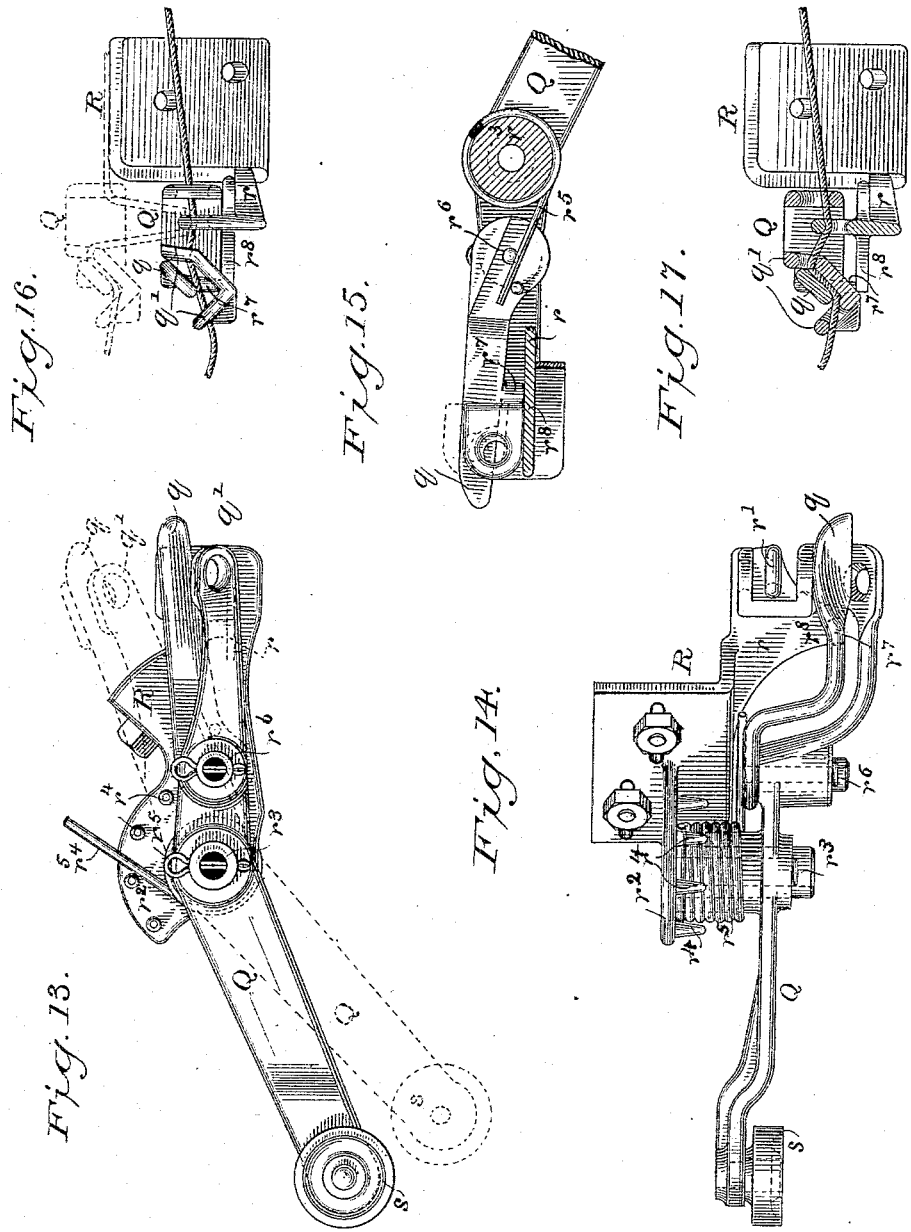

UNITED STATES PATENT OFFICE.

WILLIAM R. BAKER AND HENRY E. PRIDMORE, OF CHICAGO, ILL., ASSIGNORS TO THE McCORMICK HARVESTING MACHINE COMPANY, OF SAME PLACE.

GRAIN-BINDER.

SPECIFICATION forming part of Letters Patent No. 339,518, dated April 6, 1886.

Application filed September 29, 1884. Serial No. 144,247. (No model.) Patented in England July 19, 1884, No. 10,330; in Victoria October 2, 1884, No. 3,854; in New Zealand November 20, 1884, No. 1,300; in South Australia February 2, 1885, No. 531, and in New South Wales February 3, 1885, 1,003.

*To all whom it may concern:*

Be it known that we, WILLIAM R. BAKER and HENRY E. PRIDMORE, both of Chicago, in the county of Cook and State of Illinois, have invented certain new and useful Improvements in Grain-Binders, of which the following is a specification.

A type of binder manufactured by the McCormick Harvesting Machine Company during the past season, and well known in this country, may be referred to in illustration of these improvements, although some of their features will be found applicable to machines differing in structure. In such type the grain was received upon a platform-apron, carried up an elevator at the inner end of this apron, and discharged into a descending chute or covered passage-way, where it was urged forward wisp by wisp or bunch by bunch by alternating packer-arms against tripping-fingers which closed the outer side of the chute. A section of the decking in the chute was hinged at the top and connected with the tripping devices, so that in case the grain lodged in the passage-way before reaching the trip-fingers it might press upon this section and thus start the trip. One of the packing-arms operated through a slot in the hinged section, while the other arm operated through a slot in the stationary part of the decking. The trip-clutch on a shaft operated from the harvester was connected with the trip-fingers and hinged section or "table-trip," as it is called, so as to be thrown into engagement with a loose pinion on said shaft by the starting of either or both of these tripping agencies, and this pinion when engaged drove by means of two intermediate idle-wheels a gear and cam wheel on the binder-shaft, whereby the knotter, holder, and cutter, the binding-arm and the support for the outside trip-fingers were actuated. A slack-lever controlled by a cam on one of these idle-wheels was also employed to take up or give out slack in the cord at proper intervals.

The present invention relates to improvements in the frame of the binder, dispensing with the cumbrous wood-work of the former construction, and in place thereof uniting the metal parts heretofore used by light metal ties and castings or transverse bars; to a novel construction of the table-trip; to changes in the manner of mounting and controlling the finger-trip and in its connection with the table-trip; to the slack-lever and tension which are herein made to co-operate by a single spring, and the former of which serves to lock the wheel that carries its controlling-cam whenever the binder is out of action, in order to hold the mechanism steady and in place until tripped; and to various other features, combinations, and details of construction hereinafter described and claimed.

Figure 3:
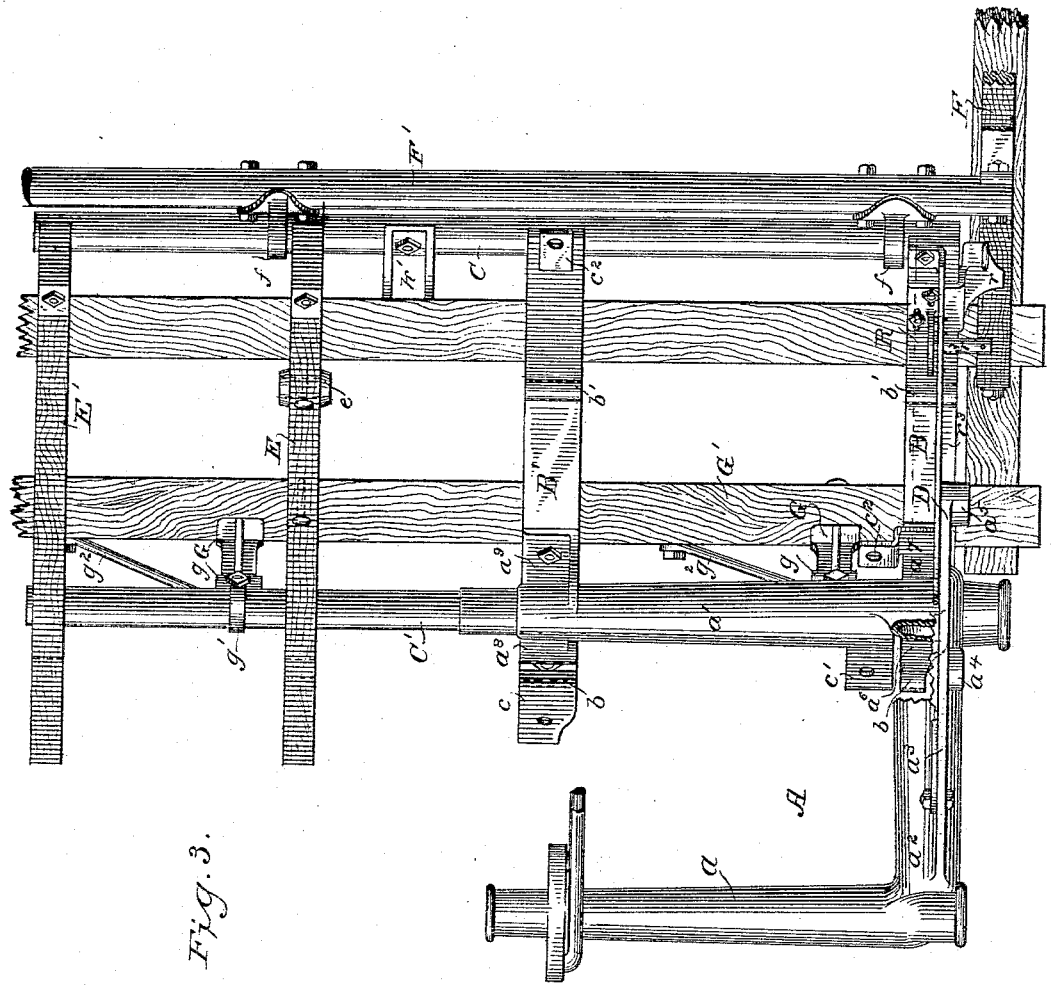
Figure 4:
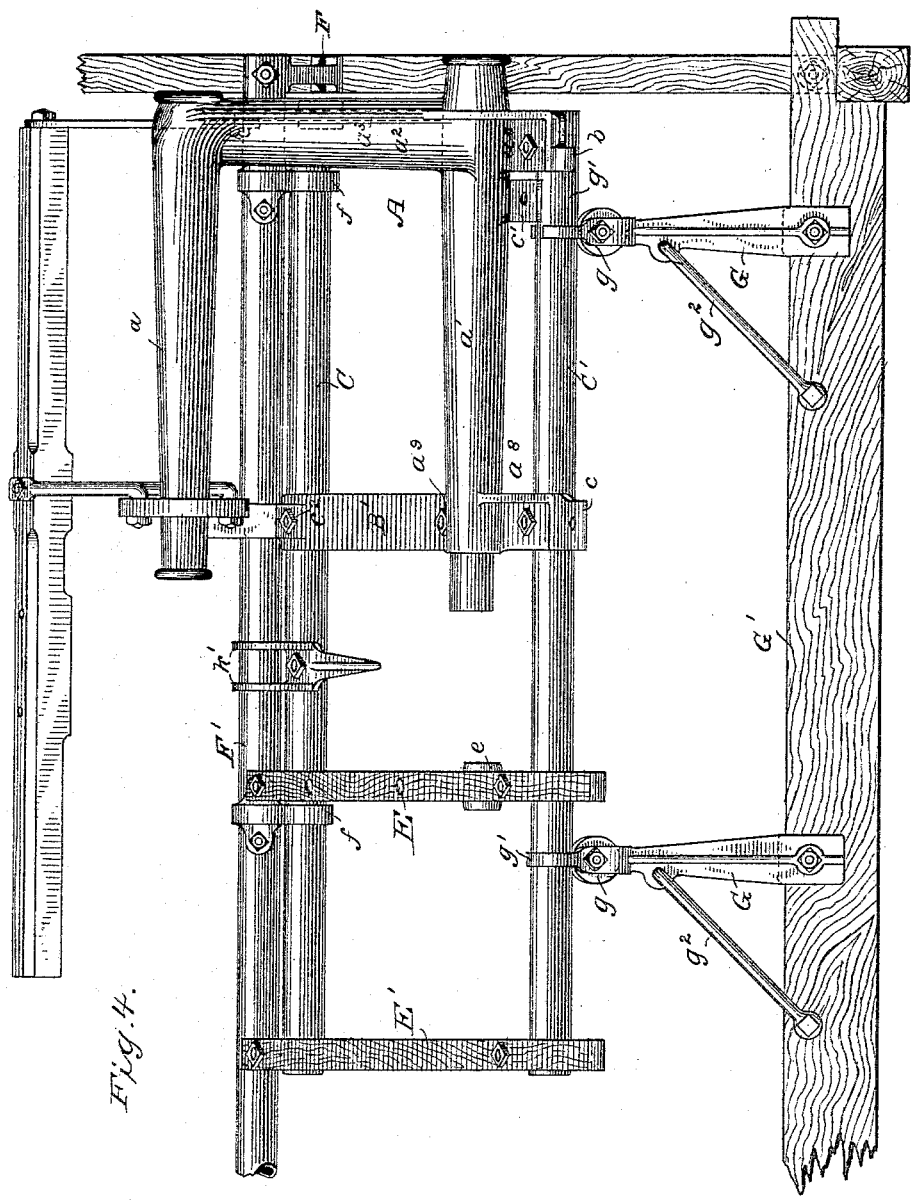

In the drawings, Figure 1 is a skeleton side elevation of a binding attachment embodying this invention, the wind-board or butt-apron and part of the frame-work being removed to more clearly expose the operative mechanism. Fig. 2 is a plan view of the same, including the frame; Fig. 3, a top plan view of the frame with the operating parts removed; Fig. 4, a front end elevation of said frame under like conditions; Fig. 5, a stubble side elevation, also with operative parts removed; Fig. 5$^a$, a side elevation of the transverse metallic frame-bars with the extension of the front bar beyond the other represented in dotted lines; Fig. 5$^b$, a plan view of said bars with same representation; Fig. 6, a detached view of the table-trip arm; Figs. 7 to 12, enlarged details of the outside tripping-fingers and mechanism immediately accessory thereto, to explain the manner in which they are rocked back for the discharge of the bound sheaf, and in such rocking actuate the hinged leaf or tail-board at the foot of the chute; Figs. 13 and 14, detached views enlarged, in elevation and plan, respectively, of the slack-lever and tension; and Figs. 15 to 17, enlarged details of said lever and tension.

A represents the post-frame or main bracket having one arm or sleeve, $a$, overhanging the binding-table or grain-chute and serving as a bearing or support for the binder-shaft, and a second arm or sleeve, $a'$, subtending said table or chute and receiving the rock-shaft which carries the binder-arm. These tubular arms are united by a post, $a^2$, strengthened by a vertical flange or web, $a^3$, bored at two points, $a^4$ and $a^5$, to receive stub-axles for the two idle-gears in the train communicating motion to the binder-shaft, and from the lower or subtending arm project ears or lugs $a^6$ $a^7$, at an angle to said post determined by circumstances, but here shown as slightly obtuse, the lug $a^7$ being in other respects, however, a substantial extension of the post and advisably further united therewith by integral connection through the just-mentioned vertical flange, as shown. Opposite to these lugs are other lugs, $a^8$ $a^9$, in the same plane therewith, and also integral with the post-frame, and these latter, as well as the lug $a^7$, are preferably strengthened by webs from the subtending arm and post formed in the process of casting.

Bolted to each pair of lugs or ears thus provided are transverse bars B B', of cast metal—malleable iron or steel, for instance—which on the outer or stubble side of the arm have each a bearing, $b$, for the reception of a rock-shaft, which carries the trip-finger, as presently described, and on the inner side are first bent downward or away from the plane of said ears, and provided with other bearings, $b'$, for the packer-shaft or that shaft continuously driven from the harvester, then from these bearings rise upward until they reach and saddle a tubular frame-bar, C, such as heretofore used for like purpose, to which they are secured by through-bolts, as shown. At their lower or outer ends, just inside the shaft for the tripping-fingers, they also saddle and are similarly secured to a second tubular frame-bar, C', extending parallel with the other from front to rear of the binder-frame, and beyond this last connection and outside of said shaft the bar B', which is the rearmost and lies alongside the plane of movement of the binder-arm, has a bracket-extension, $c$, in practically or nearly the same plane with a like offset or bracket, $c'$, from the subtending arm or sleeve of the post-frame, these two affording seats for the chute-decking or binding-table. Other brackets, $c^2$, are bolted to the frame at suitable points for the same purpose. Both transverse bars have also a pendent ear, $c^3$, inside of and in close proximity to the post-frame, to receive and support the tripping rock-shaft; but these ears may, if desired, be formed integral with said post-frame.

At the junction of the front transverse bar with the upper tubular bar, and preferably by the same bolt uniting the two, is secured one end of a brace-bar, D, of strap-iron or other suitable metal, which extends from this point to the upper stub-axle on the post-frame web, thus tying the post-frame firmly. The tubular frame-bars are further united in rear of the binder-arm by two wooden cross-pieces or timbers, E E', the inner one of which supports a bearing-bracket, $e$, for the rear end of the packer-shaft, this, in machines of the present type, being the one continuously driven from the harvester and on which the trip-clutch is mounted. Instead of wood, metal can be readily used in place of these timbers; but as the metal frame-work already provided gives great strength and rigidity to the whole construction they have very little strain or labor to support, and light wooden bars, such as shown, are consequently quite sufficient in their position.

Brackets F, bolted to the outer elevator-struts, near their head, receive in suitable seats a tubular supporting-bar, F', which is firmly secured in place, and guides or keepers $f$, from this bar, embrace the upper tubular frame-bar and permit it to slide longitudinally, as demanded by the adjustment of the binder. The lower tubular frame-bar rests upon properly grooved anti-friction rollers $g$, borne at the upper end of standards G from the end sill, G', of the harvester-frame. Yokes or keepers $g'$, projecting from these standards above the rollers, confine the bar against lateral displacement, and metal rods $g^2$ from the sill, hooked in and clamped to ears from the standards, which are themselves of metal, serve to brace the latter. This method of supporting the binder-frame has, however, been made the subject of an application filed as Division B of the present, on the 12th day of August, 1885, Serial No. 174,209, and is therefore not herein claimed.

Proceeding now to the description of the improvements in the binding apparatus proper: This, as heretofore, may be driven by a cranked packer-shaft, H, journaled in the frame, as already described, and having a tripping-clutch, $h$, of well-known construction. A loose pinion, $h'$, upon the end of this shaft, locked thereto whenever the clutch is tripped, communicates motion through the idle-gears $h^2$ $h^3$, mounted upon the stub-axles from the post-frame web, as stated, to the gear and cam wheel H', on the binder-shaft $h^4$, and by this wheel all the positive movements of the binding devices are produced.

A trip-shaft, I, is mounted in the bearings provided therefor in the transverse frame-bars, and when rocked in the suitable direction operates, by means of a crank or lifter at its end, to raise the trip-dog I' against the force of the spring $i$, by which it is held down, and thereby disengage it from the clutch and permit the latter to grasp the driving-pinion. A shoulder, $i'$, upon the hub of the dog, is arranged to come against a counter-shoulder, $i^2$, from a collar embracing the binder-arm shaft $i^3$, which latter forms the pivot for the dog, thus guarding against the latter falling beyond the point at which it should engage with the clutch. The spring $i$, as usual, is coiled about a guide-rod rising from the actuating-crank $i^4$, on the end of the binder-arm shaft.

Instead of the hinged wooden table-section formerly adopted, a narrow forked or slotted metal frame, K, is employed, the two side bars of which extend along the side of and within the slot in the decking for the play of the binder-arm $k$, and lie one on each side of the latter as it rises. This frame is hinged to a bracket, $k'$, from the upper tubular framebar, which is practically at the head of said slot and extends down therefrom until its lower end, which is for this purpose somewhat narrowed, reaches and passes between the outside trip-fingers, being free to play up and down therebetween. It rests upon an arm, $k^2$, from a casting affixed to the rear end of the trip rock-shaft, so that when depressed by the accumulation or obstruction of grain above it it will force down said arm and rock the shaft to disengage the trip-dog. On the binder-arm shaft, which it will be understood subtends the grain table or deck, or on the hub of the binder-arm is a cam or lug, $k^3$, in such position that as the arm rises and approaches the end of its ascent in the binding operation following the engagement of the trip-clutch, it strikes against the under surface of the metal table-trip and lifts it to give an additional compression to the sheaf over that given by the packers and binding-cord.

In order to bring about co-operation between the table-trip and the outside compressing-fingers, the casting or sleeve from which the already-mentioned trip-arm $k^2$ extends inwardly and upwardly until it comes against the under side of the table-trip to support the latter and respond to its movements, is provided upon the opposite side of the trip-shaft with a second arm, $k^4$, extending outwardly to one side of and beneath the pivoted trip-fingers L, where it rests upon a lug, $l$, from a heel-extension of one or both, so that as said fingers are pushed back upon their pivot they will lift this second trip-arm and rock the trip-shaft while the table-trip, if itself depressed, will push down the opposite arm, rocking said shaft in the same direction. Thus the trip-dog will be unlatched from the trip-clutch by the proper movement of either of these devices under pressure of the grain.

The trip-fingers are bolted to a skeleton block, $l'$, having an arched crown with longitudinal and transverse slots. A tongue, $l^2$, from the base of the fingers takes into the transverse slot or slots, while a clamping-bolt, $l^3$, passes from said base through the longitudinal slot. Thus by loosening the bolt the fingers may be adjusted in and out along the block to diminish or increase the grain-receiving space and consequent size of the gavel. The block $l'$, which in this instance forms the above-styled "heel-extension" of the fingers, instead of being pivoted upon supporting-arms hinged to the heel of the binder-arm and sustained by links from an underlying rock-shaft, as heretofore, is mounted directly upon a rock-shaft, M, supported in the outer bearings of the transverse frame-bars and subtending the binding-table near the outer edge of the latter, and plays upon said shaft as a pivot. The links $m$, which control the heels of the packer-arms $m'$, are also pivotally suspended from this shaft; but the packer-arms themselves are driven in the usual manner by direct connection with cranks $m^2$ on the driving-shaft.

Keyed fast to the shaft which carries the trip-fingers, and alongside the supporting-block or heel-piece of said fingers, is a casting, N, having a lateral pin or lug, $n$, which takes into a lateral slot, $n'$, in said heel-piece, and a radially-extending arm, $n^2$, link-connected with the tail-board O of the binding receptacle, so that whenever the shaft is rocked said casting may both swing the trip-fingers back with it and open the tail-board. To this swinging movement the trip arm from the trip rock-shaft resting simply upon an open lug and not within a closed eye, as heretofore, affords no obstacle. A crank, $o$, on the end of this last-mentioned rock-shaft, is connected with the gear and cam wheel by an elastic pitman, $o'$, and T-head $O'$, similar to the one formerly used for opening and closing the aforesaid supporting-bar, so that when the binding mechanism starts the shaft will be operated by the action of said cam-wheel.

As the connection between the tripping-fingers and the casting fixed to the rock-shaft is by slot and pin, said fingers are permitted to swing back on the shaft under the pressure of the incoming grain a sufficient distance to start the trip, provided they are previously held in such position that the pin is normally at the outer end of the slot. This is accomplished by the trip arm or lever from the trip rock-shaft, which at its extreme end beyond the lug or socket in which it rests is brought against the offsetting lug from the heel of the trip-fingers whenever the binding operation is finished by means of the rod and spring connection between the trip-dog and the crank on the end of the binder-shaft, whereby, as the latter is in its retrograde movement to withdraw the binder-arm beneath the table to its position of rest, which movement is caused by the pitman P from the gear and cam-wheel, it forces said dog against the lifting-finger upon the end of the trip-shaft, which is thus rocked and carries the outside trip arm or lever against said lug, whereby the trip-fingers are swung inward as far as the slot-and-pin connection with their supporting-shaft permits them to go, and with precisely the same force which the accumulating gavel must overcome in order to again start the machine.

The slack-lever has heretofore been pivoted on the front board of the binder, sometimes called the "wind-board," and its heel provided with a roller which traveled upon a cam on one of the idle-wheels driven from the trip-pinion, so that its front end would be raised or depressed at proper intervals to take up or give out slack in the cord which runs through an eye in the free end.

In Letters Patent No. 292,252, granted to the McCormick Harvesting Machine Company, January 22, 1884, as assignee of Henry E. Pridmore, was described and claimed a slack-lever, acted upon at its heel end, which carried an anti-friction roller by a cam on one of the idle-pinions of the driving-train, and also having a tension-finger constantly resting upon and spring-pressed against the cord between the two guide-eyes at the free end of the lever. The cut-away portion of this cam, permitting the lever to fall to yield up slack, was described upon an easy inverted curve, so as to offer no practical resistance to the travel of the anti-friction roller. The tension-finger being in constant frictional contact with the cord between the two guide-eyes of the lever, and the latter lying between two fixed eyes on the frame, resulted in the free passage of said cord being obstructed when the binder-arm acted, and caused slack to be pulled alike from band and spool or other source of supply when the slack-lever rose.

We now propose to so arrange the end of the tension-finger $q$ relatively to the end of the slack-lever Q as to bring the former outside of an inner eye or eyes, $q'$, thereon, and of the fixed eye or eyes on the frame, and above a lateral offset from said lever, which offset may be concave, as shown, and have an eye exterior to the finger, so that whenever the finger presses upon the cord this pressure shall be between the spool and said inner guide eye or eyes of the lever. A casting, R, is secured to the front metallic frame-bar by slots and bolts, so that it may be adjusted slightly therealong, if found necessary, and from beneath this casting depends a hanger, $r$, having a guide-eye, $r'$, for the cord, which rises alongside of or between the inner eye or eyes of the slack-lever when the latter is down. Above the casting, and integral therewith, rises a vertical ear, $r^2$, bearing a stub-pivot, $r^3$, for the slack-lever, and a series of pins, $r^4$, arranged concentrically with said pivot. A spring, $r^5$, coiled about this pivot-spindle, has one arm projecting up to be sprung in between any two of the pins, to increase or diminish its stress, and the other end arranged to press upon the tension-finger beyond its pivotal connection $r^6$ with the slack-lever, thus at once forcing the tension-finger down upon or toward the lever, and through this finger exerting pressure upon said lever and holding its heel in constant contact with its controlling-cam. From the tension-finger depends a small stud, $r^7$, which, on the descent of the lever, strikes and rests upon a lateral flange, $r^8$, from the casting hanger, so that the finger is lifted from contact with the cord and the latter allowed to pull freely through while the lever is at the limit of its descent; but whenever the lever is lifted a sufficient distance to take up slack it strikes the tension-finger and carries that with it, pressing upon the cord between the inner eye and the ball or spool. The slack, which is represented by a bight of cord extending between the two inner guide-eyes and the interposed stationary eye from the hanger, is consequently pulled entirely from the portion around the sheaf until the resistance becomes so great as to overcome the tension, when it will also begin to pull from the spool or source of supply.

If the slack-lever and tension-finger had a common pivot, as in the just-mentioned patent, it is evident that the spring would no longer act upon the lever after the finger was stopped by the contact of its depending lug with the underlying flange, therefore we pivot the finger to the lever at a point along the length of the latter, between its own pivot and the guide-eyes, thus obtaining a continuous effective action of the spring.

The cam S, which controls the slack-lever, is mounted upon the side of the first idle-wheel in the driving-train, or that one in engagement with the trip-pinion on the driving-shaft, and while its general outline is the same as that heretofore employed, the cut-away portion, into which the roller $s$ on the heel of the slack-lever falls at the moment the binder is thrown out of operation and the stored up slack again yielded to the binder-arm, is formed as a sharp re-entrant notch, $s'$, of such outline as to practically embrace two sides of the roller and hold it firm against accidental displacement, so that said heel pressed forcibly up by the action of the spring upon the lever shall rise into the notch to hold the idle-wheel out of motion and steady the binding mechanism.

Of course it is not broadly novel to lock binding mechanism when out of action, since brakes have been applied to various wheels; but in the present instance it will be observed the locking device is applied to the idle-wheel next to the driving-pinion, and is furnished by the slack-lever and its cam, thus placing double functions upon these instrumentalities.

We claim—

1. The combination, substantially as hereinbefore set forth, of the metal post-frame formed as a single casting with overhanging and subtending arms, the metallic transverse frame-bars riveted to the subtending arm of said post-frame, and the upper and lower longitudinal frame-bars bolted to said transverse bars, near the ends of the latter.

2. The combination, substantially as hereinbefore set forth, of the metal post-frame formed as a single casting with overhanging and subtending arms, the metallic transverse frame-bars provided with integral bearings for the driving-shaft, trip-shaft, and trip-finger shaft and bolted to the subtending arm of the post-frame, and the upper and lower longitudinal tubular frame-bars bolted to said transverse bars.

3. The metal post-frame formed, substantially as described, as an integral casting with overhanging and subtending arms or sleeves, vertical web or flange supporting the stub-axles for the idle-gears, lugs or ears near each end of the subtending arm for the attachment of the transverse frame-bars, and offset $c'$, to afford a seat for the decking.

4. The combination, substantially as hereinbefore set forth, of the bracket formed upon the outer end of the rear transverse metal frame-bar for the support of the decking, the bracket cast integral with the subtending arm of the post-frame in practically the same plane with the former, and the corresponding brackets or risers bolted to the metal frame-work, as described and shown.

5. The combination, substantially as hereinbefore set forth, of the metal post-frame, the transverse metal bar with its integral bearings bolted to the front of said frame, the second transverse metal bar with like bearings bolted to the rear of said frame alongside the binder-arm, the tubular frame-bars extending from front to rear of the binding attachment and bolted to the ends of said transverse metal bars, and the transverse wooden bars bolted to said tubular frame-bars in rear of the binder-arm.

6. The combination, substantially as hereinbefore set forth, of the metal table-trip extending along the slot in the decking and hinged at its upper end with the trip-finger from the trip-shaft, upon which finger said table-trip rests.

7. The combination, substantially as hereinbefore set forth, of the slotted metal table-trip fitting within and playing in the slot in the wooden decking, the binding-arm playing therethrough, the trip-finger from the rock-shaft, upon which finger said table-trip rests, the trip-dog, and the trip-clutch.

8. The combination, substantially as hereinbefore set forth, of the pivoted outside trip-fingers mounted upon a rock-shaft and rocking therewith, their heel-extension and the lug therefrom, and the trip-arm from the trip-shaft resting upon said lug, whereby the trip-shaft is actuated by the rocking of said fingers.

9. The combination, substantially as hereinbefore set forth, of the outside trip-fingers, against which the grain is packed, the rock-shaft, upon which they are loosely mounted, a stop, which checks their independent vibration upon said shaft, and the pitman from the gear and cam wheel connected with a crank from said rock-shaft and actuating it after the binding mechanism is started to rock it in the direction in which said fingers yield in order to carry them beneath the decking and open the way for the discharge of the bound sheaf.

10. The combination, substantially as hereinbefore set forth, of the outside trip-fingers, the block to which they are secured with capacity of in and out adjustment, the heel-extension from said block, the rock-shaft upon which the block is mounted, the crank and pitman operated from the gear and cam wheel, and the trip-arm from the rock-shaft.

11. The combination, substantially as set forth, of the pivoted outside trip-fingers, the rock-shaft upon which they are mounted and by which they are swung beneath the decking, their heel-extension, the trip-arm from the trip-shaft resting on a lug from said heel-extension, the trip-dog and the connection between trip-dog and binder-arm shaft, whereby said fingers are forced back to position for action upon the recession of the binder-arm shaft after a sheaf is tied.

12. The combination, substantially as hereinbefore set forth, of the pivoted outside trip-fingers, the rock-shaft upon which they are mounted and by which they are swung beneath the decking, their heel-extension, the trip-arm from the trip-shaft resting on a lug from said heel-extension, the trip-dog, the curved rod connecting said dog with the crank from the binder-arm shaft, and the spring pressing it theretoward.

13. The combination, substantially as hereinbefore set forth, of the trip-fingers, the rock-shaft upon which they are pivoted, the trip-arm resting upon a lug from their heel-extension, the casting keyed to the rock-shaft and having a lateral projection taking into a slot near the base of said fingers, and the link connecting an arm from said casting with an arm from the hinged tail-board of the grain-chute or binding-receptacle, whereby the trip-fingers are permitted to yield a suitable distance and the tail-board is opened in the ensuing movement of the gear and cam wheel.

14. The combination, substantially as hereinbefore set forth, of the trip-fingers, the rock-shaft upon which they are pivoted, the trip-arm resting upon a lug from their heel-extension, the casting keyed to the rock-shaft and having a lateral projection taking into a slot near the base of said fingers, the link connecting an arm from said casting with an arm from the hinged tail-board of the binding-receptacle, the trip-dog, and the binder-arm and its shaft connected with said dog in such manner as to restore the fingers to their farthest limit of inward play after each binding operation.

15. The combination, substantially as hereinbefore set forth, of the hinged table-trip, the arm upon which it rests, the trip-shaft to which said arm is fixed, the trip-dog and clutch, the outside pivoted trip-fingers, and a second arm fixed to the trip-shaft or integral with the first-mentioned arm and extended to rest against a heel-extension from said trip-finger.

16. The combination, substantially as hereinbefore set forth, with the binding mechanism, of the slack-lever arranged to dog said mechanism and hold it steady when out of action.

17. The combination, substantially as hereinbefore set forth, with the binding mechanism, of the slack-lever and the notched or recessed cam upon one of the wheels in the train driving said mechanism arranged to act upon the heel of said lever and receive it into the recess to actuate the lever and cause it to dog the binding mechanism.

18. The combination, substantially as hereinbefore set forth, of the pivoted slack-lever, the cam upon the first idle-gear in the train driving the binder, against which cam the heel of the lever rests, the notch in said cam to permit the lever to fall, formed to receive and embrace the anti-friction roll on the heel of said lever, and the spring forcing said lever down to cause its heel to sink into said notch and lock the gearing.

19. The combination, substantially as hereinbefore set forth, of the pivoted slack-lever, the tension-finger arranged to press upon the cord passing therethrough when slack is being taken up, and means whereby the pressure of said finger is removed from the cord when the lever is down, that the cord may be drawn freely from the source of supply.

20. The combination, substantially as hereinbefore set forth, of the pivoted slack-lever, the guide-eyes at its free end, the fixed eye supported from the frame, and the tension-finger arranged to act upon the cord passing through said guide-eyes between the fixed eye and the source of supply.

21. The combination, substantially as hereinbefore set forth, of the pivoted slack-lever, its guide-eyes, the fixed eye supported from the frame, the tension-finger with its stop-lug, the flange projecting laterally from the frame to intercept said lug and stop the finger when the lever falls, and the spring acting upon the finger and lever.

22. The combination, substantially as hereinbefore set forth, of the pivoted slack-lever, its guide-eyes, the fixed eye from the frame coming between the inner two of said guide-eyes, and the tension-finger arranged to press upon the cord between an outer guide-eye of the lever and said two inner eyes.

23. The combination, substantially as hereinbefore set forth, of the pivoted slack-lever, its guide-eyes, the fixed eye from the frame coming between the inner two of said guide-eyes, the tension-finger arranged to press upon the cord between an outer guide-eye of the lever and said two inner eyes, the stop-lug from the finger, and the stop-flange from the frame.

24. The combination, substantially as hereinbefore set forth, of the pivoted slack-lever, guide-eyes at the effective end thereof, the tension-finger pivoted to the slack-lever between its guide-eyes and proper pivot, the stop-lug on said finger, the stop-flange from the frame, the spring pressing upon the finger beyond its pivotal connection with the lever, and the lever-actuating cam.

25. The combination, substantially as hereinbefore set forth, of the pivoted slack-lever, guide-eyes at the effective end thereof, a guide-eye from the frame, the tension-finger pivoted to the slack-lever between its guide-eyes and proper pivot, means whereby said finger is stopped as the lever approaches the limit of the descent, the spring pressing upon the finger beyond its pivotal connection with the slack-lever, and the lever-actuating cam with its locking-notch.

26. The combination, substantially as hereinbefore set forth, of the pivoted slack-lever and the adjustable casting which supports it.

27. The combination, substantially as hereinbefore set forth, of the slack-lever, the casting which supports it, and the metal front transverse bar of the binder-frame, to which said casting is attached and along which it is adjustable.

28. The casting for the support of the slack-lever, formed with a vertical ear carrying the pivot for said lever and a concentric series of adjusting-pins, and a hanger provided with guide-eyes practically in line with the eye or eyes in the free end of said lever.

WILLIAM R. BAKER.
HENRY E. PRIDMORE.

Witnesses:
MADISON MAGINN,
JOHN V. A. HASBROOK.